(No Model.)

G. W. CHAPIN.
COUPON CUTTER.

No. 454,850.      Patented June 30, 1891.

WITNESSES
Wm. Musser
A. B. Jenkins

INVENTOR
Gilbert W. Chapin.
by Simonds & Burdett
Attorneys

UNITED STATES PATENT OFFICE.

GILBERT W. CHAPIN, OF HARTFORD, CONNECTICUT.

COUPON-CUTTER.

SPECIFICATION forming part of Letters Patent No. 454,850, dated June 30, 1891.

Application filed March 24, 1891. Serial No. 386,192. (No model.)

*To all whom it may concern:*

Be it known that I, GILBERT W. CHAPIN, of Hartford, in the county of Hartford and State of Connecticut, have invented certain new and useful Improvements in Coupon-Cutters, of which the following is a full, clear, and exact description, whereby any one skilled in the art can make and use the same.

The object of my invention is to provide a device by means of which coupons or like articles may be cut from a sheet and retained after being cut from accidental displacement; and to this end my invention consists in the details of construction of the several parts making up the device as a whole, and in their combination, as more particularly hereinafter described, and pointed out in the claims.

Figure 1:
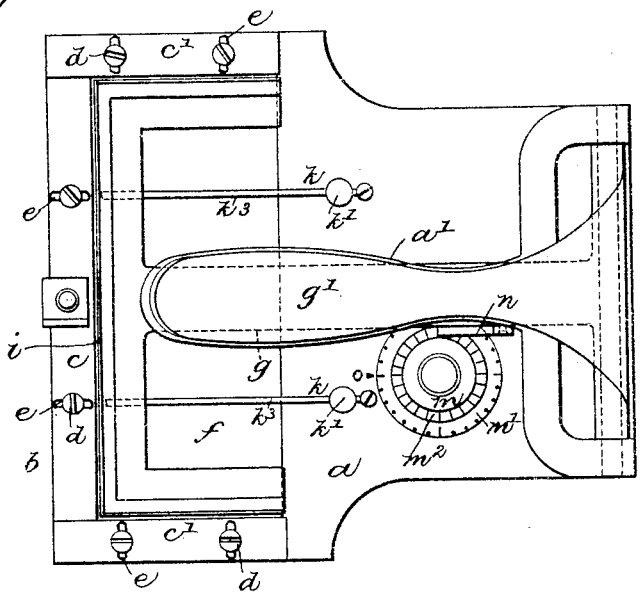
Figure 2:
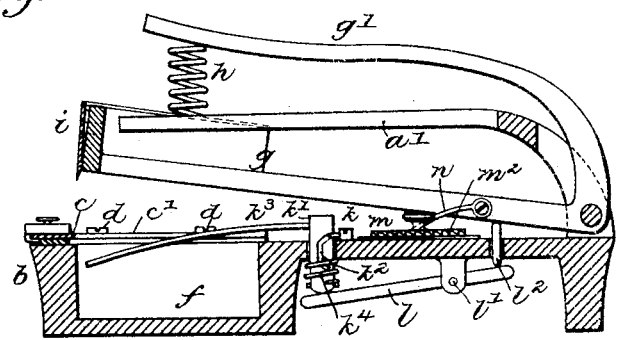

Referring to the drawings, Figure 1 is a top or plan view of a coupon-cutter embodying my invention. Fig. 2 is a detail view, in vertical section, through the same, showing construction.

In the accompanying drawings, the letter $a$ denotes the base of the machine, that is preferably made of metal, cast to shape and provided at the front part with a cutter-base $b$. To this base is secured a cutter $c$, preferably composed of several sections, with the ends $c'$ arranged at right angles to the main part of the cutter. These knives are secured to the base by means of screws $d$, passing through slots $e$ in the cutter, so as to allow for the adjustment of the latter. In front of the knives or cutters a tray $f$ is provided, and it preferably consists of a recess formed in the base. A handle $a'$, preferably formed integral with the base, overhangs it at a suitable distance above it, and a swinging cutter-lever $g$ is pivoted to the base, having secured to it a handle $g'$, that overlies the handle $a'$. A spring $h$ is preferably arranged in such manner as to keep the two handles apart, and thus hold the cutter-bar $g$ with the cutter $i$ at a suitable distance above the cutters $c$, that are secured to the base. The outer end of this cutter-lever $g$ is T-shaped, and is provided on the front and two sides with knives arranged so as to correspond and co-operate with the knives on the lower part, so that by depressing the lever the knives will operate to sever the paper that is thrust between the knives.

In order to hold the coupons in place in the tray against accidental displacement, a holding device $k$ is provided, and this consists of a tappet $k'$, vertically mounted in a socket in the base and having a cam-groove $k^2$ cut into it and arranged in such form as to cause the tappet-arm $k^3$, when the tappet is moved longitudinally, to make a quarter-turn in one direction, then to lift vertically, and then to return to a position corresponding to the first, but overlying it and the coupon. This longitudinal movement of the tappet is effected by a lever $l$, pivoted to the base at $l'$, and a connecting-rod $l^2$, extending from the cutter-lever $g$ to the arm of the lever $l$. When the cutter-lever $g$ is depressed, the rod $l^2$ is pushed down and the tappet seated on the other end of the lever is lifted. This tappet is kept in the lowermost position by means of a spiral spring $k^4$, that is seated between the lower part of the base and a pin thrust through the tappet. The function of this holder-arm is to keep the coupons in the tray, and the quarter-turn movement is necessary in order to allow the tappet-arm to be lifted to a position above the surface of the new coupon that is to be cut off after the latter has been thrust between the cutter-blades.

In order to keep an accurate count of the number of cuts made, a registering device $m$ is employed. This consists of a rotary disk $m'$, pivoted to the base and provided with a ratchet-wheel $m^2$, with the teeth of which a pawl $n$, that is pivoted to the cutter-arm, engages. A downward movement of the cutter-arm gives a sufficient sliding movement to the lower end of the pawl to move the dial a tooth-space for each movement of the cutter-arm. The outer edge of the dial is graduated into spaces, so that a new mark registers against the zero of the scale with each movement of the dial. The latter is set at zero by simply continuing the turning movement by means of the handle borne on the dial.

I claim as my invention—

1. In combination with the cutter-base provided with a series of cutters angularly disposed, a tray located below the cutters, a fixed arm overlying the cutter-base, a swinging cutter-lever provided with a handle overlying the fixed handle on the base, the cutters borne on the outer end of the cutter-arm, and the spring operating normally to hold the cutters apart, all substantially as described.

2. In combination with the cutter-base provided with a series of cutters angularly disposed, a tray located below the cutters, a fixed arm overlying the cutter-base, a swinging cutter-lever provided with a handle overlying the fixed handle on the base, the cutters borne on the outer end of the cutter-arm, the spring operating normally to hold the cutters apart, and the coupon-holder having an arm overlying the tray and in operative connection with the moving cutter-arm, all substantially as described.

3. In combination with the cutter-base provided with a series of cutters angularly disposed, a tray located below the cutters, a fixed arm overlying the cutter-base, a swinging cutter-lever provided with a handle overlying the fixed handle on the base, the cutters borne on the outer end of the cutter-arm, the spring operating normally to hold the cutters apart, and the registering device composed of the rotary disk bearing the ratchet-teeth, and the pawl pivoted to the cutter-arm at one end and with its other end engaging the ratchet-teeth, all substantially as described.

4. In combination with the cutter-base provided with a series of cutters angularly disposed, a tray located below the cutters, a fixed arm overlying the cutter-base, a swinging cutter-lever provided with a handle overlying the fixed handle on the base, the cutters borne on the outer end of the cutter-arm, the spring operating normally to hold the cutters apart, the coupon-holder having an arm overlying the tray and in operative connection with the moving cutter-arm, and the registering device composed of the rotary disk bearing the ratchet-teeth, and the pawl pivoted to the cutter-arm at one end and with its other end engaging the ratchet-teeth, all substantially as described.

GILBERT W. CHAPIN.

Witnesses:
CHAS. L. BURDETT,
WM. MUSSER.